(12) United States Patent
Bechaz et al.

(10) Patent No.: US 6,454,614 B1
(45) Date of Patent: *Sep. 24, 2002

(54) ELECTRICAL CONNECTION DEVICE COMPRISING A CATCH FOR FASTENING TO A SUPPORT RAIL

(75) Inventors: Bernard Bechaz, Caluire; Sylvain Barrat, Belleville sur Saone, both of (FR)

(73) Assignee: Entrelec S.A., Lyons (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/657,324

(22) Filed: Sep. 7, 2000

(30) Foreign Application Priority Data

Sep. 16, 1999 (FR) .............................. 99 11800
Sep. 16, 1999 (FR) .............................. 99 11801

(51) Int. Cl.[7] .................................. H01R 9/26
(52) U.S. Cl. ...................................... 439/716; 439/532
(58) Field of Search .................................. 439/532, 716

(56) References Cited

U.S. PATENT DOCUMENTS 4,878,859 A * 11/1989 Haller et al. ................ 439/716
5,103,373 A    4/1992 Rusch et al.
5,174,767 A   12/1992 Diekmann et al.
6,146,213 A *  11/2000 Yoon ........................... 439/716
6,224,429 B1 * 5/2001 Bernhards et al. .......... 439/709

FOREIGN PATENT DOCUMENTS

| DE | 32 25 855 A1 | 1/1984 |
| DE | 37 32 434 A1 | 4/1989 |
| DE | 44 09 206 C1 | 5/1995 |
| DE | 197 09 811 A1 | 9/1998 |

* cited by examiner

Primary Examiner—Tho D. Ta
Assistant Examiner—Phuongchi Nguyen
(74) Attorney, Agent, or Firm—Oliff & Berridge PLC

(57) ABSTRACT

This device includes a fastening catch disposed in an insulating housing (2), the fastening catch including two relatively sliding pieces (6) and each piece (6) exhibiting a hook (12) intended to allow latching on the support rail (4). A central hole (38) substantially perpendicular to the direction of movement of the sliding pieces (6) of the fastening catch is made in the housing so as to allow access to the fastening catch from the top of the housing, and in the latched position of the hooks (12), an edge running transversely with respect to the direction of movement of the hooks of each piece (6) is located in line with the central hole (38).

9 Claims, 3 Drawing Sheets

ELECTRICAL CONNECTION DEVICE COMPRISING A CATCH FOR FASTENING TO A SUPPORT RAIL

Figure 1:
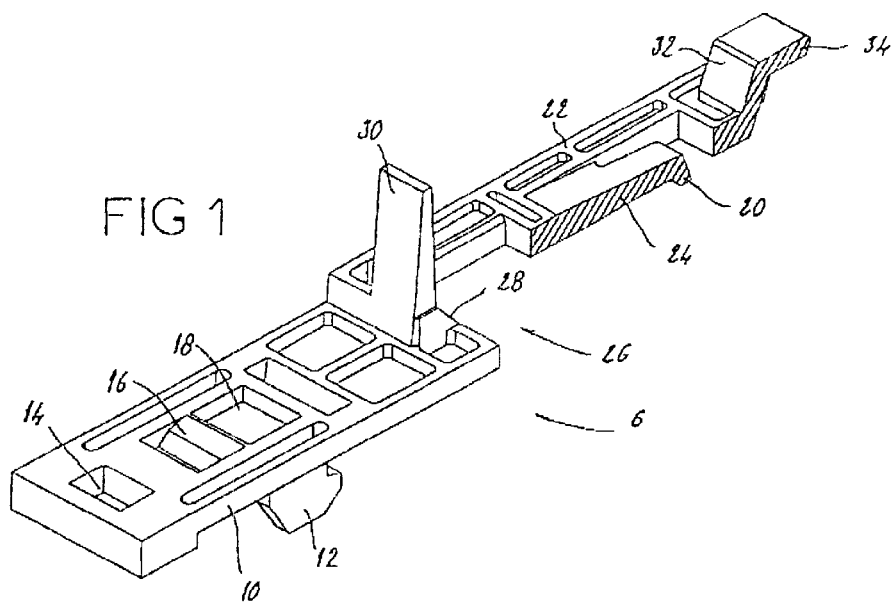

This application is related to U.S. patent application Ser. No. 09/657,322, which has matured into U.S. Pat. No. 6,293,820.

The present invention relates to on electrical connection device comprising a catch for fastening to a support rail.

The electrical connection device is for example a terminal block or a fuse holder. When the device to be mounted is relatively small in size, the fastening to the support rail is effected for example by snap-engagement. Such fastening is suitable since the force required to carry out this fastening is relatively small. For electrical devices of larger sizes, a maneuverable latching system also referred to as a fastening catch is used.

The support rails used are profiled rails exhibiting a U-shaped cross section. The free end of the branches of the U is folded back substantially at right angles toward the outside and thus forms two lateral wings. The known fastening catches generally comprise two hooks, one at least of which is moveable, each intended to grasp a lateral wing from below.

The documents EP-0 326 624 and DE-41 08 072 disclose for example such a fastening catch.

With these fastening catches one has an access problem. Specifically, it is sometimes difficult within an electrical cabinet to access the fastening catch in order to carry out latching or unlatching on the support rail. Another drawback of these fastening catches is that they are always prestressed in the latching position. This does not facilitate their mounting on the support rail.

The aim of the present invention is to provide an electrical connection device comprising a fastening catch allowing latching and unlatching on a support rail which is more readily accessible and preferably easier than for the devices of the prior art.

To this end, it proposes an electrical connection device comprising a catch for fastening to a support rail disposed in an insulating housing, the fastening catch comprising two relatively sliding pieces and each piece exhibiting a hook intended to allow latching on the support rail.

According to the invention, a central hole substantially perpendicular to the direction of movement of the sliding pieces of the fastening catch is made in the housing so as to allow access to the fastening catch from the top of the housing, and in the latched position of the hooks, an edge running transversely with respect to the direction of movement of the hooks of each piece is located in line with the central hole. In this way, it is possible to access the fastening catch from the top of the housing which is always accessible. It is sufficient to slip a flat screwdriver between the two edges of the sliding pieces and by rotating the screwdriver by 90° or more the sliding pieces are parted from one another.

The edge of each piece located in line with the central hole is advantageously beveled, so that in the mounted state of the catch, the two beveled edges face one another. This facilitates the introduction of a tool, for example a screwdriver blade, so as to act on the sliding pieces.

The two sliding pieces are preferably identical and they each exhibit the form of two elongate plates disposed one along the extension of the other with a heightwise offset, a lateral notch allowing the nesting of the two sliding pieces being provided substantially in the middle of each sliding piece. In this way, the cost price of the fastening catch is substantially reduced.

In one embodiment, each sliding piece comprises an elastic blade running perpendicularly to the direction of movement of the sliding pieces toward the inside of the housing and intended to bear against an inside wall of this housing in such a way as to prestress each sliding piece toward the latching position. There is thus no need to provide a separate restoring spring. These elastic blades run for example along the central hole.

To obtain a fastening catch which is stable in the unlatched position, a first sliding piece exhibits snap-engagement means and the second sliding piece comprises complementary snap-engagement means so that these snap-engagement means. cooperate when the sliding pieces are in the unlatched position and possibly also in the latched position.

One embodiment then provides for the first sliding piece to comprise a second hook mounted elastically in a direction substantially perpendicular to the direction of movement of the sliding pieces and for the second sliding piece to comprise two grooves intended to receive the end of the second hook. The latter is for example disposed at the end of an elastic dog cut out from the sliding piece.

So as also to be able to act on the fastening catch via the edges of the connection device, a variant embodiment provides for the two sliding pieces to overlap, for a sliding piece to comprise at one of its ends a recess intended to receive the blade of a screwdriver and for an end of the other sliding piece to exhibit at the height of the recess a raised rim intended to serve as bearing for the screwdriver.

In any event, the invention will be clearly understood with the aid of the description which follows with reference to the appended diagrammatic drawing representing by way of non-limiting examples two embodiments of a connection device according to the invention.

Figure 2:
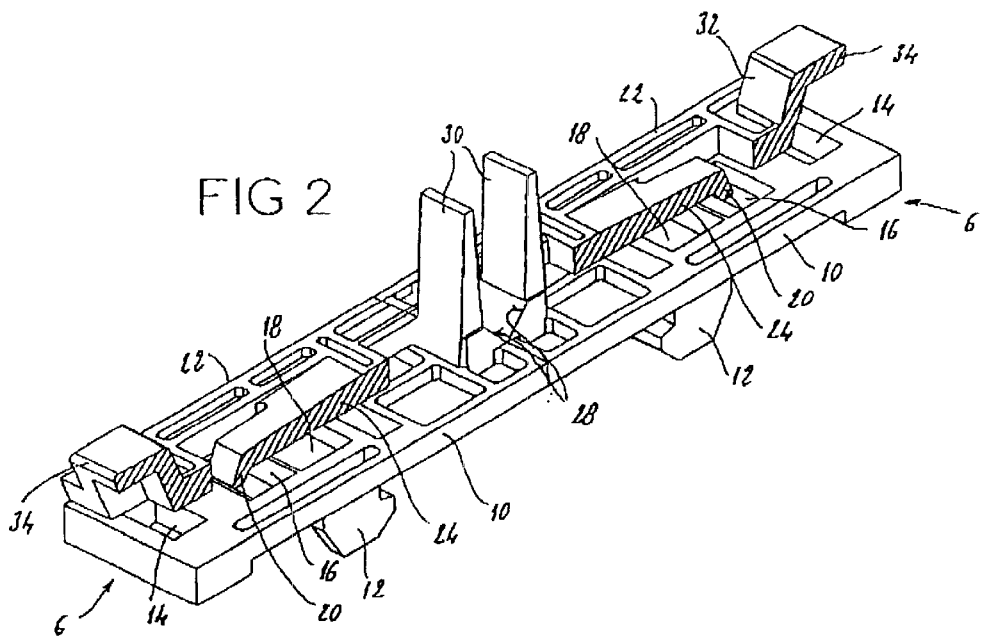
Figure 3:
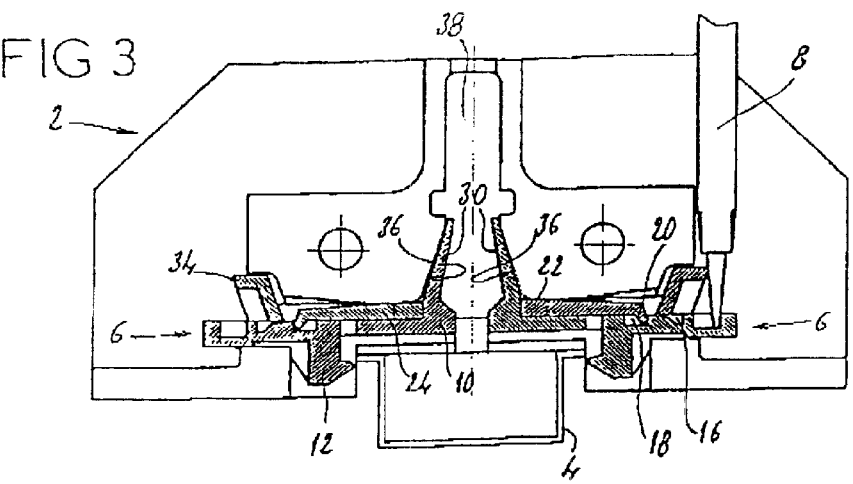
Figure 4:
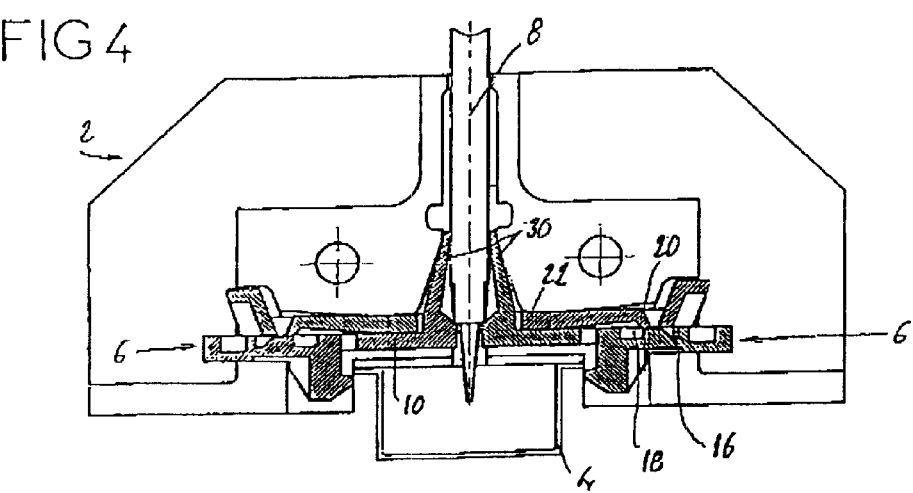
Figure 5:
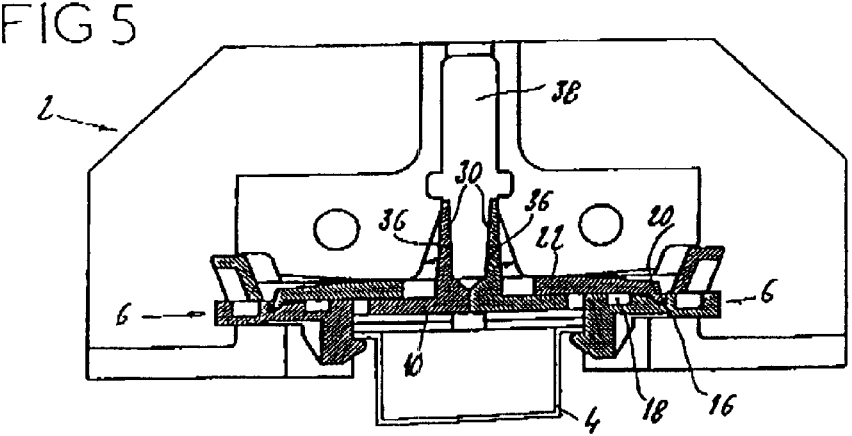
Figure 6:
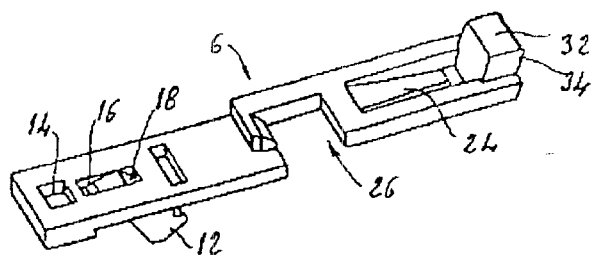
Figure 7:
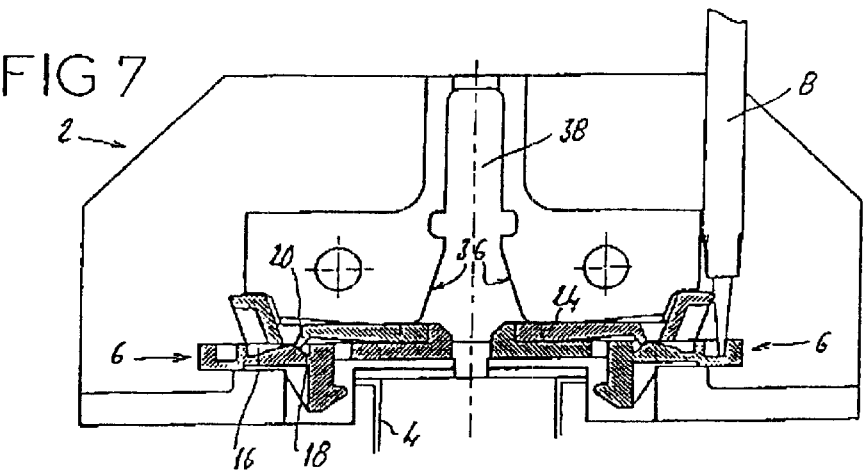
Figure 8:
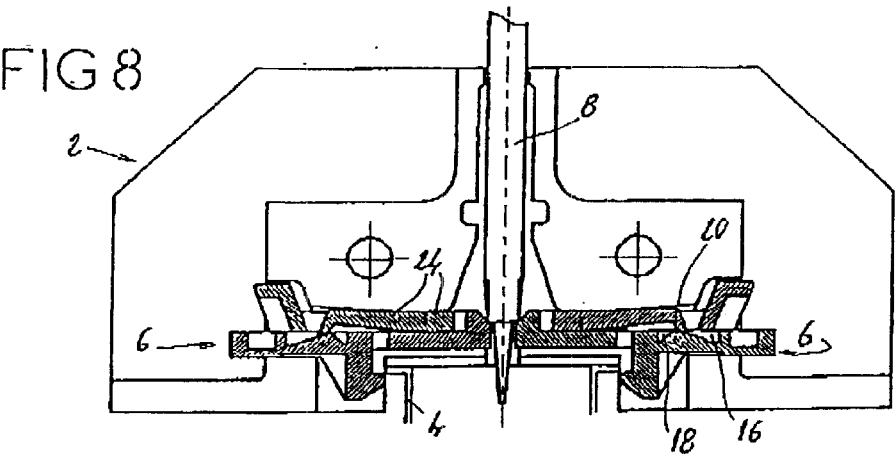
Figure 9:
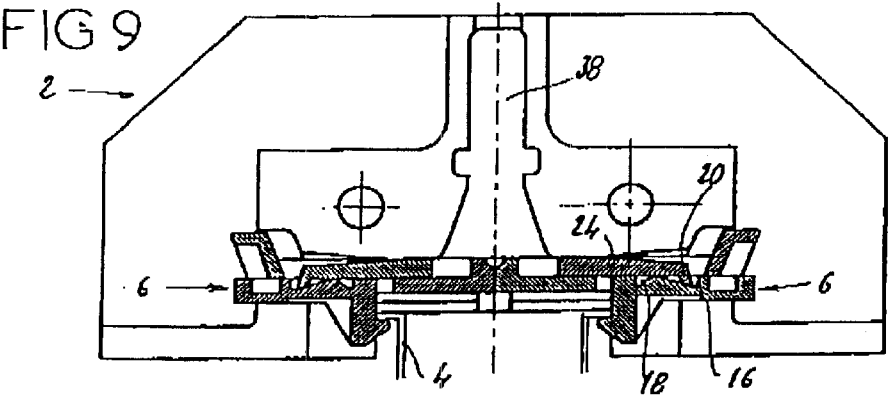

FIG. 1 is a partially cutaway perspective view of a constituent piece of a catch fitted to a connection device according to the invention, FIG. 2 is a likewise partially cutaway perspective view showing two pieces of FIG. 1, nested together, FIGS. 3 to 5 show in side view, at reduced scale, the catch of FIG. 2 mounted in a terminal block, FIG. 6 is a perspective view of a constituent piece of a bistable catch according to a variant embodiment, and FIGS. 7 to 9 are side views corresponding to FIGS. 3 to 5 for this second embodiment of a bistable catch.

FIG. 3 shows a housing 2 of an electrical connection device, for example a terminal block, placed on a support rail 4. This terminal block comprises a fastening catch consisting of two sliding pieces 6 such as those which may be seen in perspective and partially cutaway in FIG. 1. This fastening catch allows the latching and unlatching of the housing 2 on the support rail 4. It is actuated by the end of a screwdriver B.

The support rail 4 is a conventional support rail such as is known to the person skilled in the art. It consists of a profiled rail of U section, free ends of the branches of the U being folded back toward the outside. The cross section of this profile recalls the shape of a hat.

FIG. 1 shows in detail a sliding piece 6 in perspective. This sliding piece comprises two elongate plates disposed one following the other in the longitudinal direction but with a heightwise offset corresponding substantially to the thickness of an elongate plate.

A first elongate plate 10 is of substantially rectangular outline. On its lower face it carries a hook 12. The latter is intended to be brought into place under a folded-back edge of the support rail 4 so that this folded-back edge is sandwiched between the hook 12 and the first elongate plate 10.

The upper face, away from the hook 12, of the first elongate plate 10 exhibits, in proximity to its free end a recess 14 intended to receive the end of the blade of the screwdriver 8. This upper face also comprises two transverse grooves 16 and 18 intended to cooperate with an elastic hook 20 described later. The grooves 16 and 18 run transversely with respect to the plate 10. Other hollows may be observed in the first elongate plate 10. These hollows are made so as to make a saving of material. This sliding piece 6 is made by molding from a synthetic material and in order to reduce the cost of making this piece hollows are provided. One may allow oneself such hollows since the sliding pieces do not undergo high mechanical stresses.

The second elongate plate 22 runs in the same direction as the first elongate plate 10 and it extends the latter although with a heightwise offset. This second elongate plate 22 is offset toward the top with respect to the first plate 10.

The elastic hook 20 is made in this second elongate plate 22. This elastic hook is obtained by cutting out from the second elongate plate 22. An elongate dog 24 is thus made in the longitudinal direction, the free end of which is curved downward so as to form a hook.

On the first elongate plate 10 side, the second elongate plate 22 exhibits a notch 26 emerging laterally and which penetrates the plate 22 over more than half the width of the latter. The edge of this notch, located on the first elongate plate 10 side, is beveled on the upper face of the second elongate plate 22. An elastic blade 30 runs upward at the level of this beveled edge 28.

The free end of the second elongate plate 22 exhibits a boss 32 so as to exhibit a raised rim 34.

Hollows may be seen on the second elongate plate 22. Like the hollows of the first elongate plate 10, these hollows are made so as to save material when molding the sliding piece 6.

To make a fastening catch, one uses two sliding pieces which are nested together in such a way as to place the first elongate plate 10 of a sliding piece 6 under the second elongate plate 22 of the other sliding piece 6. Such an assembly is represented in perspective in FIG. 2. In order that the various parts thus represented of the fastening catch may be better seen, a zone of each sliding piece has been removed. The removed zone is identical to the remaining zone. The two pieces 6 thus mounted can slide longitudinally. The travel of the movement is given by the width of the notch 26. In the latched position, the two beveled edges 28 are located one against the other (FIGS. 2 and 5) whilst in the unlatched position the second elongate plates 22 abut against the edges opposite the beveled edges 28 of the notches 26 (FIG. 3).

The transverse snap-engagement grooves 16 and are placed in such a way on the first plates 10 that the elastic hook 20 of the other sliding piece 6 is located in the transverse groove 16 in the latched position and in the transverse groove 18 in the unlatched position.

FIGS. 3 to 5 show the fastening catch described hereinabove mounted in the housing 2 of a terminal block.

FIG. 3 shows the latching. catch in the unlatched position. The hooks 12 of the sliding pieces 6 are therefore parted from one another. The elastic hooks 20 are each located in a snap-engagement groove 18. This position is a stable position even if the elastic blades 30 exert on the remainder of each sliding piece 6 a stress tending to shift the fastening catch from the unlatched position to the latched position.

So that the elastic blades 30 exert a stress on the sliding pieces 6, stops 36 are provided in the housing 2. These stops 36 exhibit the form of an inclined plane At rest, the elastic blades 30 run substantially vertically. This rest position corresponds to the latched position represented in FIG. 5. The upper free ends of the elastic blades 30 are then in contact with the upper part of the stops 36. When the fastening catch shifts into the unlatched position, the elastic blades separate from one another. By virtue of the stops 36, the free end of the elastic blades 30 does not move whilst the base of these elastic blades moves with the remainder of the sliding piece 6. In the unlatched position (FIG. 3), each elastic blade 30 substantially hugs the stop-forming corresponding inclined surface 36.

As already indicated previously, the unlatched position is a stable position since each elastic hook 20 is captured in the corresponding snap-engagement groove 16. There is no need to retain the screwdriver 8 in the position represented in FIG. 3 in order to keep the fastening catch in the unlatched position. To shift from the unlatched position to the latched position, it is sufficient to push on one end of a sliding piece 6 toward the support rail 4 so as to unsnap the elastic hook 20 from the corresponding snap-engagement groove 16. The elastic blades 30 then return the sliding pieces to the latched position. The elastic hooks 20 are then captured in the snap-engagement grooves 18 as shown in FIG. 5. This latched position is also a stable position.

To shift from the latched position to the unlatched position, it is necessary to part the hooks 12. One solution consists in passing the screwdriver through a keyway 38 made for this purpose in the housing 2. This keyway runs in line with the beveled edges 28. These beveled edges then allow the end of the blade of the screwdriver 8 to be introduced between the two sliding pieces 6, as represented in FIG. 4. The sliding pieces 6 are then in an intermediate position. The elastic hooks 20 are located between the snap-engagement grooves 16 and the snap-engagement grooves 18. It is then sufficient to twist the screwdriver 8, by at most 90°, in order to return the sliding pieces to the unlatched position represented in FIG. 3.

It is also, for example, possible to bring the end of the blade of the screwdriver 8 into one of the two recesses 14 and, by bearing on the raised rim 34 of the other sliding piece, one pulls one sliding piece 6 and pushes the other. The elastic hooks 20 then come out of the corresponding transverse grooves 18 and are brought into place in the snap-engagement notches 16. One is then in the position represented in FIG. 3.

As may be seen, this fastening catch exhibits numerous advantages. It can be actuated from the center or laterally. Thus, when the housing 2 is mounted on the support rail 4 and connections are made, it is sometimes difficult to get access between the wires connected to the edges of the housing 2. With the new fastening catch according to the invention, as described above, it is then possible to unlatch the housing from the support rail via the center. It may also be noted that the fastening catch may be accessed equally well from either side. Moreover, a single maneuver is sufficient to move the two hooks 12. The housing 2 is thus freed from the rail 4 in a single operation. This fastening catch also exhibits the advantage of being stable both in the latched position and in the unlatched position- This allows very great convenience of use for the operator who needs to mount the housing on the support rail and dismount it therefrom.

This fastening catch is also easy to make. As indicated above, it consists of two pieces made of a molded synthetic material. Moreover, these two pieces are strictly identical A single mold is therefore sufficient and the mounting operation is greatly simplified.

FIGS. 6 to 9 show a variant embodiment of a fastening catch according to the invention. The same references are used here to denote similar pieces.

The essential difference between the bistable catch of FIGS. 1 to 5 and the bistable catch of FIGS. 6 to 9 is the absence of an elastic blade in the second embodiment. Apart from this difference, the structure is similar. There are two identical sliding pieces 6. Each of these sliding pieces includes a first elongate plate 10 furnished with a recess 14 intended to receive the free end of a screwdriver and two snap-engagement grooves 16 and 18 as well as a second elongate plate 22 in which is made a notch 26 as well as an elastic dog 24 carrying an elastic hook 20. There are also a boss 32 and a raised rim 34.

The manner of operation of this bistable catch is substantially identical except that there is no elastic restoring force toward the latched position. The latch effect is then less significant. However, given that in the latched position the two sliding pieces snap-engage with one another, there is nevertheless good latching.

An advantage of this embodiment relative to the first embodiment is the heightwise space saving. This second embodiment can be used when the room available heightwise is limited.

This second variant embodiment includes the same advantages as those described hereinabove with reference to the first embodiment.

As goes without saying, the invention is not limited to the two embodiments described hereinabove by way of non-limiting examples; on the contrary it encompasses all variants thereof within the framework of the claims hereinafter.

Thus for example, it would be quite possible to have two sliding pieces which are not identical. It would be quite possible to obtain a similar manner of operation with two different pieces.

Two snap-engagement grooves need not necessarily be provided on each sliding piece. Indeed, it may be noted that the snap-engagement groove corresponding to the latched position could be dispensed with when the fastening catch is prestressed in the latched position.

Means other than elastic blades may be employed to ensure a prestress toward the latched position. It would, for example, be possible to use a metal spring, for example a helical spring, which would be linked at one of Its ends to a sliding piece and at its other end to the other sliding piece. Even when using elastic blades, the latter could be placed differently and even exhibit a different form from that shown in the drawing.

What is claimed is:

1. An electrical connection device comprising:
    an insulating housing;
    a catch for fastening the housing to a support rail, the fastening catch being disposed within the housing and comprising a first piece and a second piece sliding within the housing between a latched position and an unlatched position, each piece exhibiting a hook to allow latching on the support rail and an edge running transversely with respect to the direction of movement of the hook, the edges of the first and second sliding pieces being one against the other in the latched position; and
    a hole going through the housing to allow access to the joined edges of the first and second sliding pieces in the latched position.

2. The electrical connection device as claimed in claim 1, wherein the two sliding pieces are identical and wherein they each exhibit the form of two elongate plates disposed one along the extension of the other with a heightwise offset, a lateral notch allowing nesting of the two sliding pieces being provided substantially in the middle of each sliding piece.

3. The electrical connection device as claimed in claim 1, wherein the edge of each piece is beveled, so that in the latched position the two beveled edges face one another.

4. The electrical connection device as claimed in claim 1, wherein:
    the two sliding pieces overlap;
    the first sliding piece comprises at one of its ends a recess to receive the blade of a screwdriver; and
    the second sliding piece exhibits at the height of the recess of the first sliding piece a raised rim to serve as a bearing for the screwdriver.

5. The electrical connection device as claimed in claim 1, wherein each sliding piece comprises an elastic blade running substantially perpendicularly to the direction of movement of the first and second sliding pieces toward the inside of the housing and configured to bear against an inside wall of the housing in such a way as to prestress each sliding piece toward the latching position.

6. The electrical connection device as claimed in claim 5, wherein the elastic blades run along the hole of the housing.

7. The electrical connection device as claimed in claim 1, wherein the first sliding piece comprises snap-engagement means and the second sliding piece comprises complementary snap-engagement means so that the snap-engagement means of the first and second sliding piece cooperate at least when the sliding pieces are in the unlatched position.

8. The electrical connection device as claimed in claim 7, wherein:
    the snap-engagement means of the first sliding piece comprises a hook elastically movable in a direction substantially perpendicular to directions of movement of the sliding pieces; and
    the complementary snap-engagement means of the second sliding piece comprises one groove to receive the end of the hook of the snap-engagement means of the first sliding piece in the latched position and one groove to receive the end of the hook of the snap-engagement means of the first sliding piece in the unlatched position.

9. The electrical connection device as claimed in claim 8, wherein the hook of the snap-engagement means is disposed at the end of an elastic dog portion of the first sliding piece.

* * * * *

UNITED STATES PATENT AND TRADEMARK OFFICE
CERTIFICATE OF CORRECTION

PATENT NO.    : 6,454,614 B1
DATED         : September 24, 2002
INVENTOR(S)   : Bernard Bechaz et al.

It is certified that error appears in the above-identified patent and that said Letters Patent is hereby corrected as shown below:

<u>Title page,</u>
Item [73], should read -- [73] Assignee: Entrelec S.A., Lyon (FR) --
Item [30], should read -- [30] Foreign Application Priority Data,
-- September 16, 1999   (FR) .................. 99 11801 --

Signed and Sealed this

Eighteenth Day of March, 2003

JAMES E. ROGAN
*Director of the United States Patent and Trademark Office*